US008188617B2

(12) United States Patent
Kimura et al.

(10) Patent No.: US 8,188,617 B2
(45) Date of Patent: May 29, 2012

(54) CURRENT BALANCING APPARATUS, CURRENT BALANCING METHOD, AND POWER SUPPLY APPARATUS

(75) Inventors: Kengo Kimura, Niiza (JP); Shinji Aso, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 344 days.

(21) Appl. No.: 12/691,225

(22) Filed: Jan. 21, 2010

(65) Prior Publication Data

US 2010/0194199 A1 Aug. 5, 2010

(30) Foreign Application Priority Data

Feb. 3, 2009 (JP) ................................ 2009-022415

(51) Int. Cl.
*H02J 3/14* (2006.01)

(52) U.S. Cl. .......................... 307/32; 315/213; 315/312

(58) Field of Classification Search .................... 307/31, 307/32
See application file for complete search history.

(56) References Cited

U.S. PATENT DOCUMENTS

| | | | | |
|---|---|---|---|---|
| 7,285,921 | B2 * | 10/2007 | Chen | 315/291 |
| 2006/0022610 | A1 * | 2/2006 | Ball | 315/213 |
| 2006/0119293 | A1 * | 6/2006 | Chan et al. | 315/312 |

FOREIGN PATENT DOCUMENTS

| | | |
|---|---|---|
| JP | 11-67471 | 3/1999 |
| JP | 2002-8409 | 1/2002 |
| JP | 2003-332624 | 11/2003 |

OTHER PUBLICATIONS

U.S. Appl. No. 12/691,225, filed Jan. 21, 2010, Kimura, et al.
U.S. Appl. No. 12/722,999, filed Mar. 12, 2010, Aso, et al.
U.S. Appl. No. 12/706,115, filed Feb. 16, 2010, Aso, et al.

* cited by examiner

*Primary Examiner* — Rexford Barnie
*Assistant Examiner* — Toan Vu
(74) *Attorney, Agent, or Firm* — Oblon, Spivak, McClelland, Maier & Neustadt, L.L.P.

(57) ABSTRACT

A current balancing apparatus includes a first transformer having a first primary winding and a first secondary winding electromagnetically coupled with the first primary winding, the first primary winding having a first end connected to a first load that passes a first current; a second transformer having a second primary winding and a second secondary winding electromagnetically coupled with the second primary winding, the second primary winding having a first end connected to a second load that passes a second current having an AC component substantially having a 180-degree phase difference with respect to the first current; and a series circuit including the first secondary winding, the second secondary winding, and a current smoother, to balance the first current and second current with each other.

8 Claims, 3 Drawing Sheets

CURRENT BALANCING APPARATUS, CURRENT BALANCING METHOD, AND POWER SUPPLY APPARATUS

BACKGROUND OF THE INVENTION

1. Field of the Invention

The present invention relates to a current balancing apparatus, a current balancing method, and a power supply apparatus, for balancing currents passing through a plurality of loads connected in parallel.

2. Description of the Related Art

An example of an apparatus for supplying power to a plurality of loads is an apparatus for lighting a plurality of LEDs (Light Emitting Diodes) disclosed in Japanese Unexamined Patent Application Publication No. 2003-332624 (Document 1).

FIG. 1 illustrates the LED driving apparatus disclosed in Document 1. The apparatus has a DC power source Vdd, a step-up circuit 27, LEDs 21 to 26, sink drivers 12 to 14, bypass units 15 to 17, and a selector 18. The sink drivers 12 to 14 turn on/off in response to time division signals S1 to S3. Each of ends of the sink drivers 12 to 14 is connected to related one of terminals P23 to P25 each connected to the LEDs 21 to 26. The bypass units 15 to 17 are connected in parallel with the sink drivers 12 to 14 and pass currents when the sink drivers 12 to 14 are OFF, the currents being small not to make the LEDs 21 to 26 emit light.

The selector 18 detects a drain-source voltage of one of the sink drivers 12 to 14 and a current passing through one of the three lines of the LEDs 21 to 26 and controls an output voltage from the step-up circuit (converter) 27.

According to this related art, the sink drivers 12 to 14 pass necessary currents through the LEDs 21 to 26 during a period of lighting the LEDs 21 to 26. During a period of not lighting the LEDs 21 to 26, the sink drivers 12 to 14 stop the currents and the bypass units 15 to 17 bypass small currents, to prevent an output voltage from the converter 27 from jumping up.

Other related arts are disclosed in, for example, Japanese Unexamined Patent Application Publications No. H11-67471 and No. 2002-8409.

SUMMARY OF THE INVENTION

According to the related art illustrated in FIG. 1, a step-up reactor L27 and a high-frequency switch Q27 are used to generate a stepped-up, high-frequency voltage, which is rectified and smoothed with a diode D27 and an electrolytic capacitor C27, to apply a stepped-up DC voltage to the LEDs 21 to 26.

Generally, LEDs have variations in forward voltages Vf. Accordingly, currents passing through the LEDs 21 to 26 connected in parallel are not equal to one another. For this, the related art employs the sink drivers 12 to 14 that are constant current circuits (current mirror circuits), to apply different voltages according to the different Vf values, to balance the currents passing through the LEDs 21 to 26 with one another. The sink drivers 12 to 14 cause losses depending on applied voltages and thereby deteriorate efficiency.

The present invention provides a current balancing apparatus, a current balancing method, and a power supply apparatus, capably of minimizing losses that occur when balancing currents passing through loads and improving efficiency.

According to a first aspect of the present invention, the current balancing apparatus includes a first transformer having a first primary winding and a first secondary winding electromagnetically coupled with the first primary winding, the first primary winding having a first end connected to a first load that passes a first current; a second transformer having a second primary winding and a second secondary winding electromagnetically coupled with the second primary winding, the second primary winding having a first end connected to a second load that passes a second current; and a series circuit including the first secondary winding, the second secondary winding, and a current smoother, wherein the first current and the second current load are balanced with each other.

According to a second aspect of the present invention, the power supply apparatus includes a series resonant circuit including a transformer; a plurality of switching elements to pass a current to the series resonant circuit; a first transformer connected to an output of the series resonant circuit and having a first primary winding and a first secondary winding electromagnetically coupled with the first primary winding, the first primary winding having a first end connected to a first load; a second transformer connected to an output of the series resonant circuit and having a second primary winding and a second secondary winding electromagnetically coupled with the second primary winding, the second primary winding having a first end connected to a second load; a series circuit including the first secondary winding, the second secondary winding, and a current smoother; a current detector to detect a current passing through the series circuit; and a controller to turn on/off the plurality of switching elements according to an output from the current detector.

According to a third aspect of the present invention, the current balancing method includes connecting a primary winding of a first transformer to a first load that passes a first current; connecting a primary winding of a second transformer to a second load that passes a second current; and connecting a secondary winding of the first transformer electromagnetically coupled with the primary winding of the first transformer, a secondary winding of the second transformer electromagnetically coupled with the primary winding of the second transformer, and a current smoother in series, thereby passing a current to balance the first current and second current with each other.

According to these aspects of the present invention, the first secondary winding, second secondary winding, and current smoother that form the series circuit pass a current to balance the first current and second current with each other, thereby reducing losses that may occur when balancing the currents passing through the loads and improving efficiency.

DESCRIPTION OF THE PREFERRED EMBODIMENT

A current balancing apparatus, a current balancing method, and a power supply apparatus according to embodiments of the present invention will be explained in detail with reference to the drawings.

Figure 1:
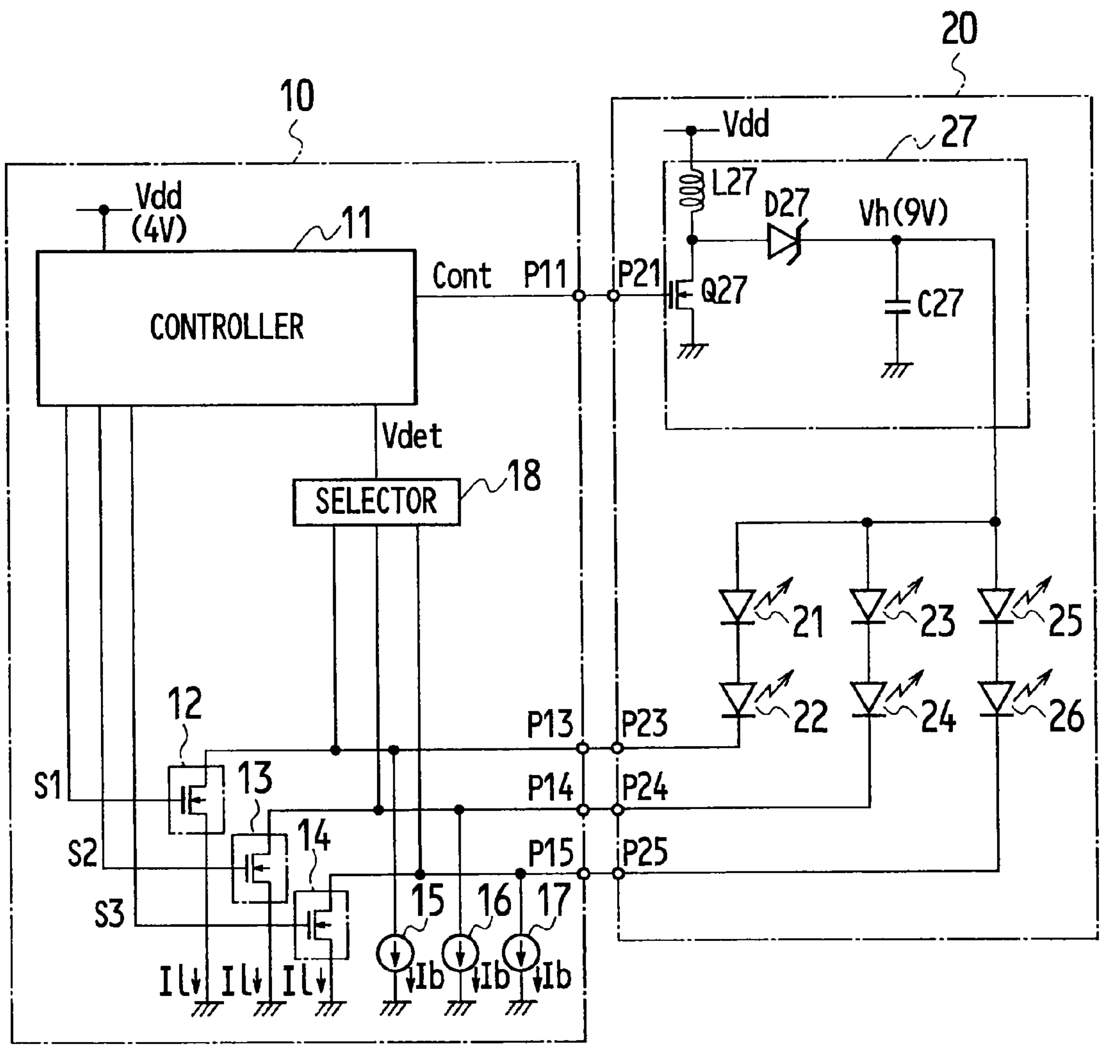
FIG. 1 is a block diagram illustrating an LED lighting apparatus according to a related art.
Figure 2:
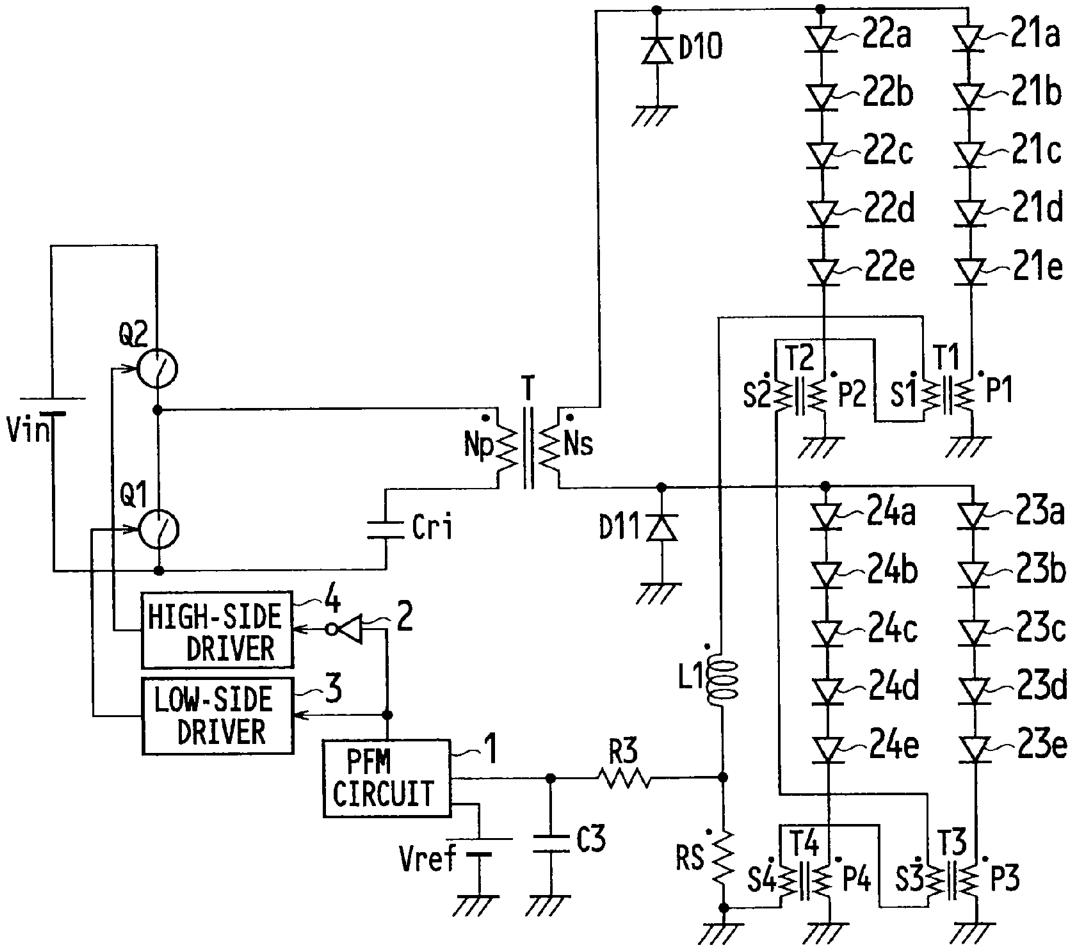
FIG. 2 is a block diagram illustrating a power supply apparatus having a current balancing apparatus according to an embodiment of the present invention.

FIG. 2 is a block diagram illustrating a power supply apparatus having a current balancing apparatus according to an embodiment of the present invention. In this embodiment, the power supply apparatus having the current balancing apparatus is used as an LED lighting apparatus.

In FIG. 2, both ends of a DC power source Vin are connected to a series circuit including switching elements Q1 and Q2 made of MOSFETs. A connection point between the switching elements Q1 and Q2 is connected to a series resonant circuit including a primary winding Np of a transformer T and a current resonant capacitor Cri. The transformer T has a leakage inductance.

The transformer T has a secondary winding Ns whose first end is connected to LEDs 21*a* to 21*e* connected in series, LEDs 22*a* to 22*e* connected in series, and a flywheel diode D10.

A second end of the secondary winding Ns of the transformer T is connected to LEDs 23*a* to 23*e* connected in series, LEDs 24*a* to 24*e* connected in series, and a flywheel diode D11.

A cathode of the LED 21*e* is connected to a first end of a primary winding P1 of a transformer T1 (corresponding to the "first transformer" stipulated in the claims). A second end of the primary winding P1 is grounded. A cathode of the LED 22*e* is connected to a first end of a primary winding P2 of a transformer T2 (corresponding to the "first transformer" stipulated in the claims). A second end of the primary winding P2 is grounded.

A cathode of the LED 23*e* is connected to a first end of a primary winding P3 of a transformer T3 (corresponding to the "second transformer" stipulated in the claims). A second end of the primary winding P3 is grounded. A cathode of the LED 24*e* is connected to a first end of a primary winding P4 of a transformer T4 (corresponding to the "second transformer" stipulated in the claims). A second end of the primary winding P4 is grounded.

A secondary winding S1 of the transformer T1, a secondary winding S2 of the transformer T2, a secondary winding S3 of the transformer T3, a secondary winding S4 of the transformer T4, a resistor Rs, and a reactor L1 are connected in series to form a closed-loop constant current circuit. The constant current circuit operates as a balancing circuit due to its function. The reactor L1 corresponds to the "current smoother" stipulated in the claims and smoothes a current passing through the constant current circuit. In the smoothed current, an AC component is left to achieve a current balancing action (explained later).

A connection point between the resistor Rs and the secondary winding S4 is grounded. The resistor Rs serves as a current detector. A connection point between the resistor Rs and the reactor L1 is connected to a series circuit including a resistor R3 and a capacitor C3. The series circuit converts a voltage containing an AC component into a DC voltage.

A PFM circuit 1 compares the voltage of the capacitor C3 with a reference voltage Vref and generates a pulse signal. At this time, the PFM circuit 1 changes the frequency of the pulse signal according to the voltage of the capacitor C3.

An inverter 2 inverts the pulse signal from the PFM circuit 1 and supplies the inverted pulse signal to a high-side driver 4. A low-side driver 3 receives the pulse signal from the PFM circuit 1, and according to the pulse signal, turns on/off the switching element Q1. The high-side driver 4 turns on/off the switching element Q2 according to the inverted pulse signal from the inverter 2.

Alternately turning on/off the switching elements Q1 and Q2 and the frequency of the pulse signal control input voltages to the LEDs 21*a* to 21*e*, LEDs 22*a* to 22*e*, LEDs 23*a* to 23*e*, and LEDs 24*a* to 24*e*.

Operation of the LED lighting apparatus of the above-mentioned configuration will be explained with reference to FIG. 3.

Figure 3:
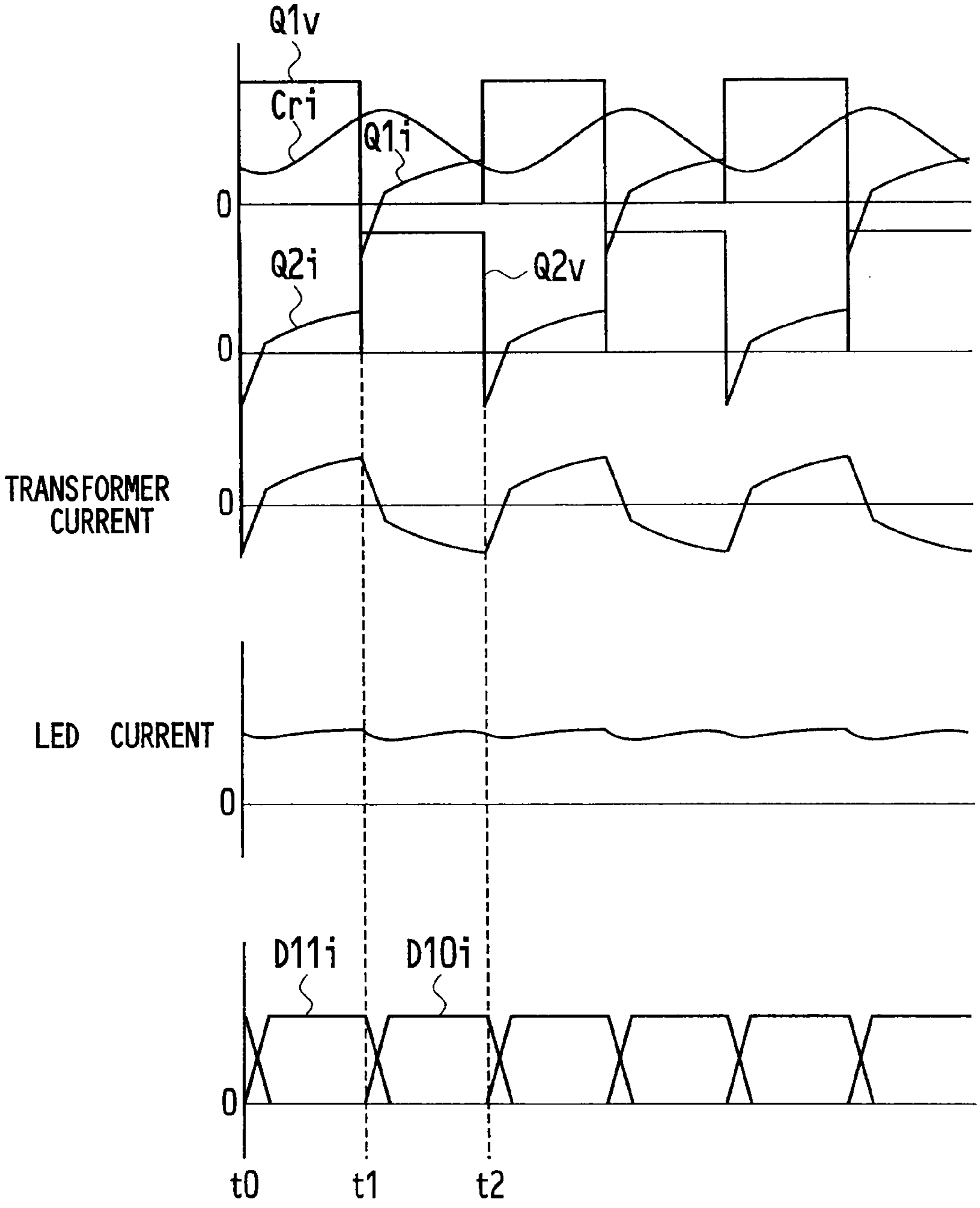
FIG. 3 is a timing chart illustrating operation of the power supply apparatus of FIG. 2.

In FIG. 3, a waveform Q1*v* illustrates a drain-source voltage of the switching element Q1, a waveform Q1*i* a drain current of the switching element Q1, a waveform Q2*v* a drain-source voltage of the switching element Q2, a waveform Q2*i* a drain current of the switching element Q2, a waveform D10*i* a current to the flywheel diode D10, and a waveform D11*i* a current to the flywheel diode D11 in the same manner.

At time t0, the switching element Q1 is OFF and the switching element Q2 turns on to pass the current Q2*i* in a minus (counterclockwise) direction through a path extending along Vin (positive terminal), Q2, Np, Cri, and Vin (negative terminal). As time passes, the current increases into a plus (clockwise) direction to charge the current resonant capacitor Cri.

At this time, the secondary winding Ns of the transformer T generates a voltage to pass a transformer current Nsi, LED currents, and the current D11*i* through a path extending along the first end of Ns, LEDs 21*a* to 21*e* (LEDs 22*a* to 22*e*), P1 (P2), D11, and the second end of Ns.

At time t1, the switching element Q2 turns off and the switching element Q1 turns on. The primary winding Np of the transformer T generates a voltage in a reverse direction so that the current Q1*i* passes in a minus (clockwise) direction through a path extending along Cri, Np, Q1, and Cri. As time passes, the current increases into a plus (counterclockwise) direction to discharge the current resonant capacitor Cri.

At this time, the secondary winding Ns of the transformer T generates a voltage in response to the voltage of the reverse direction generated by the primary winding Np. This results in passing the transformer current Nsi, LED currents, and current D10*i* through a path extending along the second end of Ns, LEDs 23*a* to 23*e* (LEDs 24*a* to 24*e*), P3 (P4), D10, and the first end of Ns.

Namely, a current passing through the LEDs 23*a* to 23*e* and P3 (LEDs 24*a* to 24*e* and P4) has an AC component that substantially has a 180-degree phase difference with respect to a current passing through the LEDs 21*a* to 21*e* and P1 (LEDs 22*a* to 22*e* and P2). Operation after time t2 is the same as that in the period from t0 to t2, and therefore, the explanation thereof is omitted.

A current balancing method according to an embodiment of the present invention will be explained.

As explained above, at time t0, the LEDs 21*a* to 21*e* and the primary winding P1 of the transformer T1 pass an equal LED current. This LED current causes the primary winding P1 to generate magnetic flux. This magnetic flux causes the secondary winding S1 of the transformer T1 to generate magnetic flux. This magnetic flux causes the secondary winding S1 to generate a current passing through the closed-loop constant current circuit.

Also at time t0, the LEDs 22*a* to 22*e* and the primary winding P2 of the transformer T2 pass an equal LED current. This LED current causes the primary winding P2 to generate magnetic flux. This magnetic flux causes the secondary winding S2 of the transformer T2 to generate magnetic flux. This magnetic flux causes the secondary winding S2 to generate a current passing through the closed-loop constant current circuit.

At time t1, the LEDs 23*a* to 23*e* and the primary winding P3 of the transformer T3 pass an equal LED current. This LED current causes the primary winding P3 to generate magnetic flux. This magnetic flux causes the secondary winding S3 of the transformer T3 to generate magnetic flux. This magnetic flux causes the secondary winding S3 to generate a current passing through the closed-loop constant current circuit.

Also at time t1, the LEDs 24*a* to 24*e* and the primary winding P4 of the transformer T4 passes an equal LED current. This LED current causes the primary winding P4 to generate magnetic flux. This magnetic flux causes the secondary winding S4 of the transformer T4 to generate magnetic flux. This magnetic flux causes the secondary winding S4 to generate a current passing through the closed-loop constant current circuit.

The currents based on the magnetic flux generated by the secondary windings S1 to S4 all pass through the closed-loop constant current circuit, and therefore, are balanced (equalized) to a constant value even if the currents inherently differ from one another. This results in balancing (equalizing) the magnetic flux generated by the secondary windings S1 to S4, thereby balancing (equalizing) the magnetic flux generated by the primary windings P1 to P4. As results, the LED current passing through the LEDs 21*a* to 21*e* and primary winding P1, the LED current passing through the LEDs 22*a* to 22*e* and primary winding P2, the LED current passing through the LEDs 23*a* to 23*e* and primary winding P3, and the LED current passing through the LEDs 24*a* to 24*e* and primary winding P4 are balanced (equalized) with one another.

In this way, the LED lighting apparatus, i.e., the power supply apparatus having the current balancing apparatus according to the embodiment balances (equalizes) currents passing through the primary windings P1 to P4. The reactor L1 smoothes the LED currents. As results, the LEDs 21*a* to 21*e*, LEDs 22*a* to 22*e*, LEDs 23*a* to 23*e*, and LEDs 24*a* to 24*e* uniformly emit light.

The embodiment does not employ the sink drivers 12 to 14 of the related art made of constant current drivers, and therefore, the embodiment reduces losses in the balancing circuit and improves efficiency.

According to the embodiment, the PFM circuit 1 compares a voltage representative of a current detected by the current detector with the reference voltage Vref, to alternately turn on/off the switching elements Q1 and Q2 and control voltages supplied to the LEDs 21*a* to 21*e*, LEDs 22*a* to 22*e*, LEDs 23*a* to 23*e*, and LEDs 24*a* to 24*e*. Namely, the embodiment does not require the electrolytic capacitor C27 of the related art having a short service life. The LED lighting apparatus, i.e., the power supply apparatus having the current balancing apparatus according to the embodiment is manufacturable at low cost, is small, and has a long service life.

The present invention is not limited to the LED lighting apparatus mentioned above. According to the above-mentioned embodiment, the first end of the secondary winding Ns of the transformer T is connected to two groups of series-connected LEDs and the second end of the secondary winding Ns is connected to two groups of series-connected LEDs. The number of groups of series-connected LEDs is optional, for example, one, three, or more, provided that each of the first and second ends of the secondary winding Ns is connected to the same number of groups of series-connected LEDs.

The present invention is applicable to an LED lighting apparatus to light LEDs serving as, for example, backlights of a liquid crystal display.

This application claims benefit of priority under 35USC §119 to Japanese Patent Application No. 2009-022415, filed on Feb. 3, 2009, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A current balancing apparatus comprising:
a first transformer having a first primary winding and a first secondary winding electromagnetically coupled with the first primary winding, the first primary winding having a first end connected to a first load;
a second transformer having a second primary winding and a second secondary winding electromagnetically coupled with the second primary winding, the second primary winding having a first end connected to a second load; and
a series circuit including the first secondary winding, the second secondary winding, and a current smoother, wherein
a first current passing through the first load and a second current passing through the second load are balanced with each other.

2. The current balancing apparatus of claim 1, wherein
the first current has a 180-degree phase difference with respect to the second current.

3. The current balancing apparatus of claim 1, wherein
a second end of the first primary winding and a second end of the second primary winding are grounded.

4. The current balancing apparatus of claim 1, wherein
each of the loads is provided with a rectifying element and regenerative element.

5. The current balancing apparatus of claim 2, wherein
each of the loads is provided with a rectifying element and regenerative element.

6. The current balancing apparatus of claim 3, wherein
each of the loads is provided with a rectifying element and regenerative element.

7. A power supply apparatus comprising:
a series resonant circuit including a transformer;
a plurality of switching elements configured to pass a current through the series resonant circuit;
a first transformer connected to an output of the series resonant circuit and having a first primary winding and a first secondary winding electromagnetically coupled with the first primary winding, the first primary winding having a first end connected to a first load;
a second transformer connected to an output of the series resonant circuit and having a second primary winding and a second secondary winding electromagnetically coupled with the second primary winding, the second primary winding having a first end connected to a second load;
a series circuit including the first secondary winding, the second secondary winding, and a current smoother;
a current detector configured to detect a current passing through the series circuit; and
a controller configured to turn on/off the plurality of switching elements according to an output from the current detector.

8. A current balancing method including:
connecting a primary winding of a first transformer to a first load;
connecting a primary winding of a second transformer to a second load; and
connecting a secondary winding of the first transformer electromagnetically coupled with the primary winding of the first transformer, a secondary winding of the second transformer electromagnetically coupled with the primary winding of the second transformer, and a current smoother in series, thereby passing a current to balance the current of the first load and the current of the second load with each other.

* * * * *